(12) United States Patent
Ukita (10) Patent No.: US 7,397,544 B2
(45) Date of Patent: Jul. 8, 2008

(54) DISTORTION MEASURING DEVICE, METHOD, PROGRAM, AND RECORDING MEDIUM

(75) Inventor: Junichi Ukita, Saitama (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 11/619,406

(22) Filed: Jan. 3, 2007

(65) Prior Publication Data

US 2007/0159621 A1     Jul. 12, 2007

(30) Foreign Application Priority Data

Jan. 11, 2006    (JP)   ................... P2006-003872

(51) Int. Cl.
     *G01N 21/00*      (2006.01)
(52) U.S. Cl. .................................... 356/73.1
(58) Field of Classification Search ................ None
See application file for complete search history.

(56) References Cited

U.S. PATENT DOCUMENTS 6,366,348 B1 * 4/2002 Sato et al. ................... 356/73.1

2007/0171401 A1 * 7/2007 Ukita ........................ 356/73.1

FOREIGN PATENT DOCUMENTS

| JP | 2001-165808 | 6/2001 |
|---|---|---|
| JP | 2002-257592 | 9/2002 |

OTHER PUBLICATIONS

English language Abstract of JP 2001-165808.
English language Abstract of JP 2002-257592.
U.S. Appl. No. 11/567,942 to Ukita, filed Dec. 7, 2006.
U.S. Appl. No. 11/571,692 to Kurosawa, filed Jan. 5, 2007.

* cited by examiner

*Primary Examiner*—Tu T Nguyen
(74) *Attorney, Agent, or Firm*—Greenblum & Bernstein, P.L.C.

(57) ABSTRACT

There is provided a distortion measuring device including a Brillouin scattered light spectrum recording unit which records a spectrum of Brillouin scattered light generated in an optical fiber as a result of supplying incident light, a peak frequency approximating unit which acquires an approximated peak frequency at which the recorded spectrum takes a maximal value, a peak frequency deriving unit which derives a peak frequency at which the spectrum takes the maximal value within a range of a frequency determined based on a magnitude of the spectrum at the approximated peak frequency, amid a distortion deriving unit which derives distortion of the optical fiber based on the derived peak frequency.

14 Claims, 14 Drawing Sheets

Spectrum at Point B

Fig. 6

Spectrum at Point C

PRIOR ART

Fig. 13

PRIOR ART

Fig. 14

PRIOR ART

DISTORTION MEASURING DEVICE, METHOD, PROGRAM, AND RECORDING MEDIUM

BACKGROUND OF THE INVENTION

1. Field of the Invention

The present invention relates to measurement of distortion of an optical fiber.

2. Description of the Prior Art

Conventionally, Brillouin scattered light is coherently detected by supplying an optical fiber with pulsed light generated by pulsing continuous wave light to acquire Brillouin scattered light from the optical fiber (refer to FIG. 8 of Japanese Laid-Open Patent Publication (Kokai) No. 2001-165808). The coherent detection is carried out by multiplexing the Brillouin scattered light and intensity-modulated light obtained by applying intensity modulation to the continuous wave light at a predetermined frequency, for example. It should be noted that the intensity-modulated light includes a carrier light component and side band light components of optical frequency.

A signal corresponding to the Brillouin scattered light is extracted by a filter form a result of the coherent detection thereby obtaining a power spectrum of the Brillouin scattered light. It should be noted that the power spectrum of the Brillouin scattered light is acquired while the predetermined frequency is being changed. Moreover, a peak frequency where the power of the Brillouin scattered light takes the maximum value is acquired by fitting a predetermined function (such as a Lorentzian function) to the power spectrum of Brillouin scattered light. A value of distortion of the optical fiber is obtained based on the peak frequency.

Figure 12:
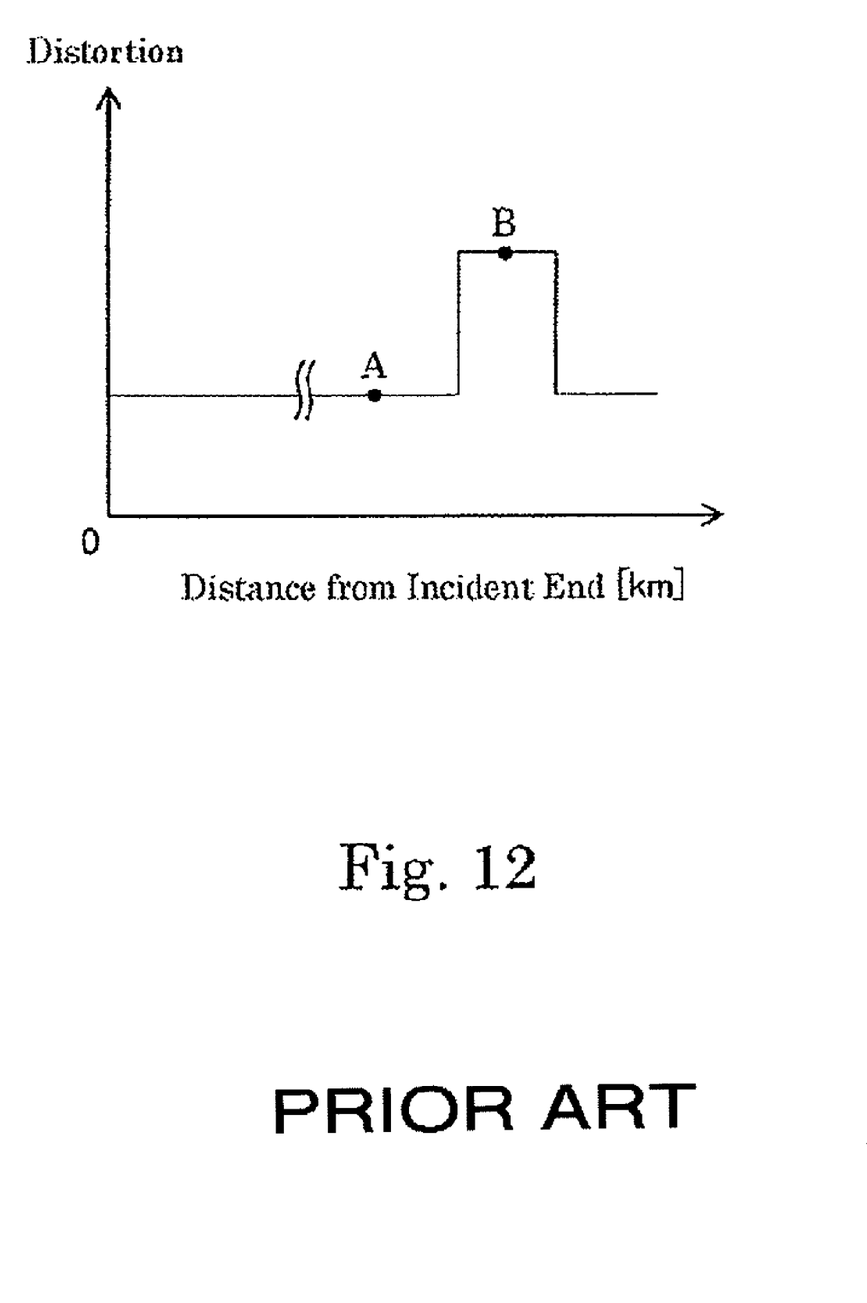
FIG. 12 is a chart associating the distortion with the distance from an incident end of the optical fiber according to prior art.

FIG. 12 shows an example of a distortion distribution of an optical fiber FIG. 12 is a chart associating the distortion with the distance from an incident end of the optical fiber according to prior art. According to the distortion distribution shown in FIG. 12, the optical fiber has a point A presenting a small distortion, and a point B presenting a large distortion. When pulsed light is supplied to the optical fiber having the distortion distribution shown in FIG. 12, there is obtained a power spectrum of Brillouin scattered light as shown in FIG. 13.

Figure 13:
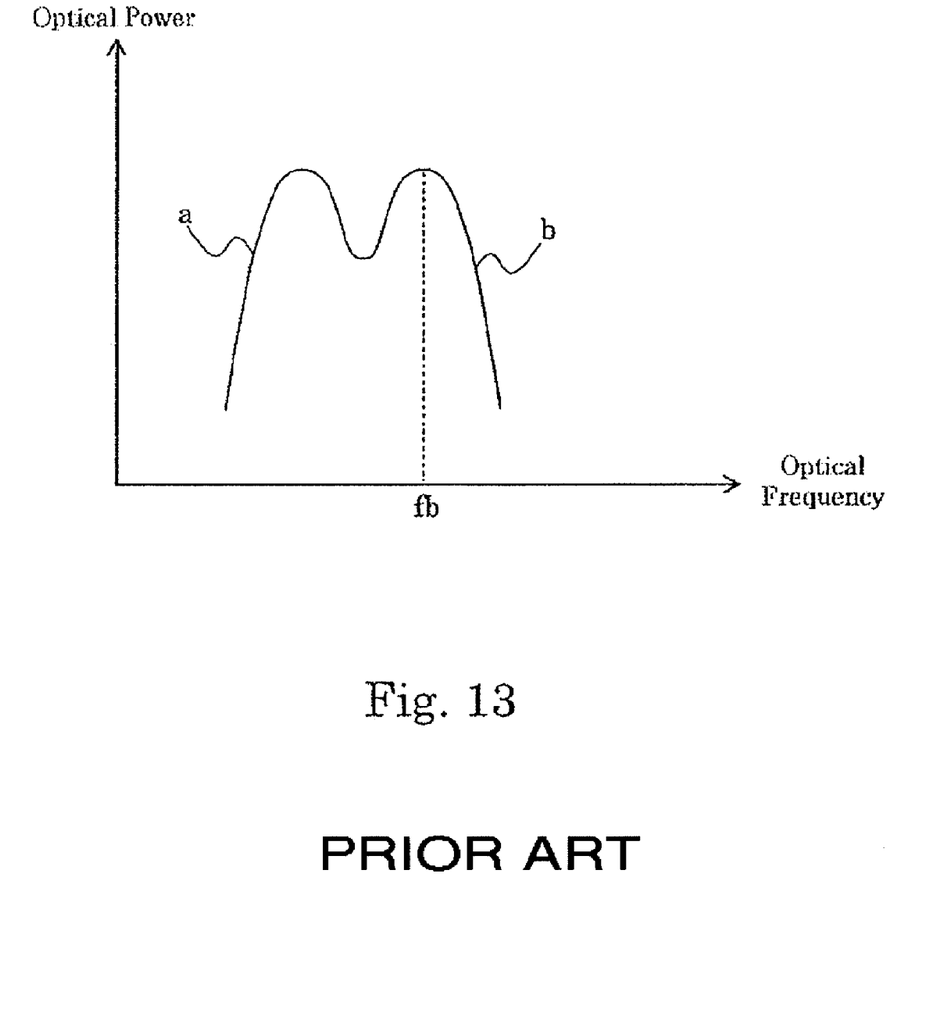
FIG. 13 is a chart associating the optical power with the optical frequency of the Brillouin scattered light according to prior art.

FIG. 13 is a chart associating the optical power with the optical frequency of the Brillouin scattered light according to prior art. As shown in FIG. 13, there is obtained a power spectrum "a" due to the point A and a power spectrum "b" due to the point B. In order to measure the distortion at the point B, it is necessary to acquire a peak frequency fb of the power spectrum "b".

Figure 14:
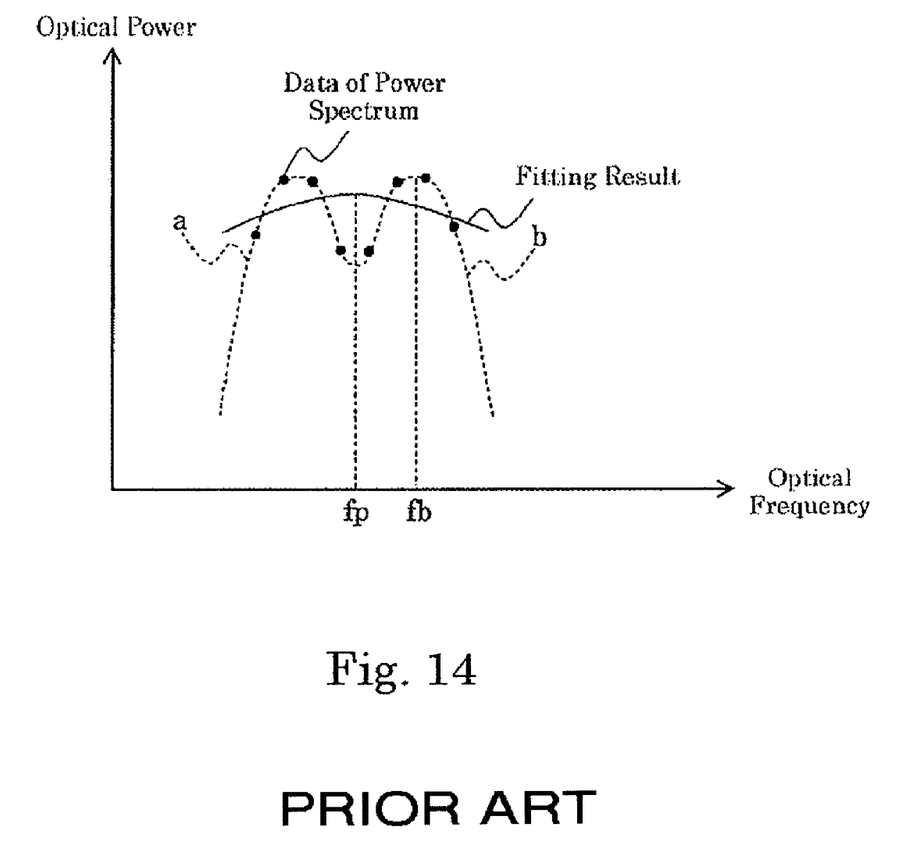
FIG. 14 is a diagram showing an actually-measured peak frequency fp acquired by fitting a predetermined function (such as a Lorentzian function) to a power spectrum of the Brillouin scattered light according to the prior art shown in FIG. 13.

However it is difficult to precisely acquire the peak frequency fb. FIG. 14 shows an actually-measured peak frequency fp acquired by fitting the predetermined function (such as a Lorentzian function) to the power spectrum of the Brillouin scattered light according to the prior art shown in FIG. 13.

In FIG. 13, the power spectrum is shown as a solid line. However, the data of the power spectrum is actually discrete as shown in FIG. 14, and thus requires fitting. The result of the fitting to the power spectrum is influenced by the power spectrum "a" in addition to the power spectrum "b". As a result, the actually-measured peak frequency fp where the result of the fitting takes the peak is displaced from the peak frequency fb. It is thus difficult to precisely measure the distortion of the optical fiber at the point B.

SUMMARY OF THE INVENTION

It is an object of the present invention to precisely measure distortion of a device under test (such as an optical fiber).

According to the present invention, a distortion measuring device includes: a peak frequency approximating unit that acquires an approximated peak frequency at which a spectrum of Brillouin scattered light generated by supplying a device under test with incident light takes a maximal value; a peak frequency deriving unit that derives a peak frequency at which the spectrum takes a maximal value within a range of a frequency acquired based on a magnitude of the spectrum at the approximated peak frequency; and a distortion deriving unit that derives distortion of the device under test based on the derived peak frequency.

According to the thus constructed distortion measuring device, a peak frequency approximating unit acquires all approximated peak frequency at which a spectrum of Brillouin scattered light generated by supplying a device under test with incident light takes a maximal value, A peak frequency deriving unit derives a peak frequency at which the spectrum takes a maximal value Within a range of a frequency acquired based on a magnitude of the spectrum at the approximated peak frequency. A distortion deriving unit derives distortion of the device under test based on the derived peak frequency.

According to the distortion measuring device of the present invention, if there are two types of the approximated peak frequency, the range of the frequency may be a predetermined range from the approximated peak frequency at which the spectrum takes a larger value.

According to the distortion measuring device of the present invention, if there are two types of the approximated peak frequency and the spectrum at a first approximated peak frequency is larger than the spectrum at a second approximated peak frequency by a value equal to or more than a predetermined value, the range of the frequency may be a predetermined range from the first approximated peak frequency.

According to the distortion measuring device of the present invention, the peak frequency deriving unit may approximate the spectrum in the range of the frequency by a predetermined function, and derive a frequency at which the predetermined function takes a maximal value as the peak frequency.

According to the distortion measuring device of the present invention, the incident light may be pulsed light, and the predetermined range may be defined by a pulse width of the pulsed light.

According to the present invention, a distortion measuring method includes: a peak frequency approximating step of acquiring an approximated peak frequency at which a spectrum of Brillouin scattered light generated by supplying a device under test with incident light takes a maximal value; a peak frequency deriving step of deriving a peak frequency at which the spectrum takes a maximal value within a range of a frequency acquired based on a magnitude of the spectrum at the approximated peak frequency; and a distortion deriving step of deriving distortion of the device under test based on the derived peak frequency.

The present invention is a program of instructions for execution by the computer to perform a processing for measuring a distortion, the processing including: a peak frequency approximating step of acquiring an approximated peak frequency at which a spectrum of Brillouin scattered light generated by supplying a device under test with incident light takes a maximal value; a peak frequency deriving step of deriving a peak frequency at which the spectrum takes a maximal value within a range of a frequency acquired based on a magnitude of the spectrum at the approximated peak frequency; and a distortion deriving step of deriving distortion of the device under test based on the derived peak frequency.

The present invention is a computer-readable medium having a program of instructions for execution by the computer to perform a processing for measuring a distortion, the processing including a peak frequency approximating step of acquiring an approximated peak frequency at which a spectrum of Brillouin scattered light generated by supplying a device under test with incident light takes a maximal value; a peak frequency deriving step of deriving a peak frequency at which the spectrum takes a maximal value within a range of a frequency acquired based on a magnitude of the spectrum at the approximated peak frequency; and a distortion deriving step of deriving distortion of the device under test based on the derived peak frequency.

DETAILED DESCRIPTION OF THE PREFERRED EMBODIMENTS

A description will now be given of an embodiment of the present invention with reference to drawings.

Figure 1:
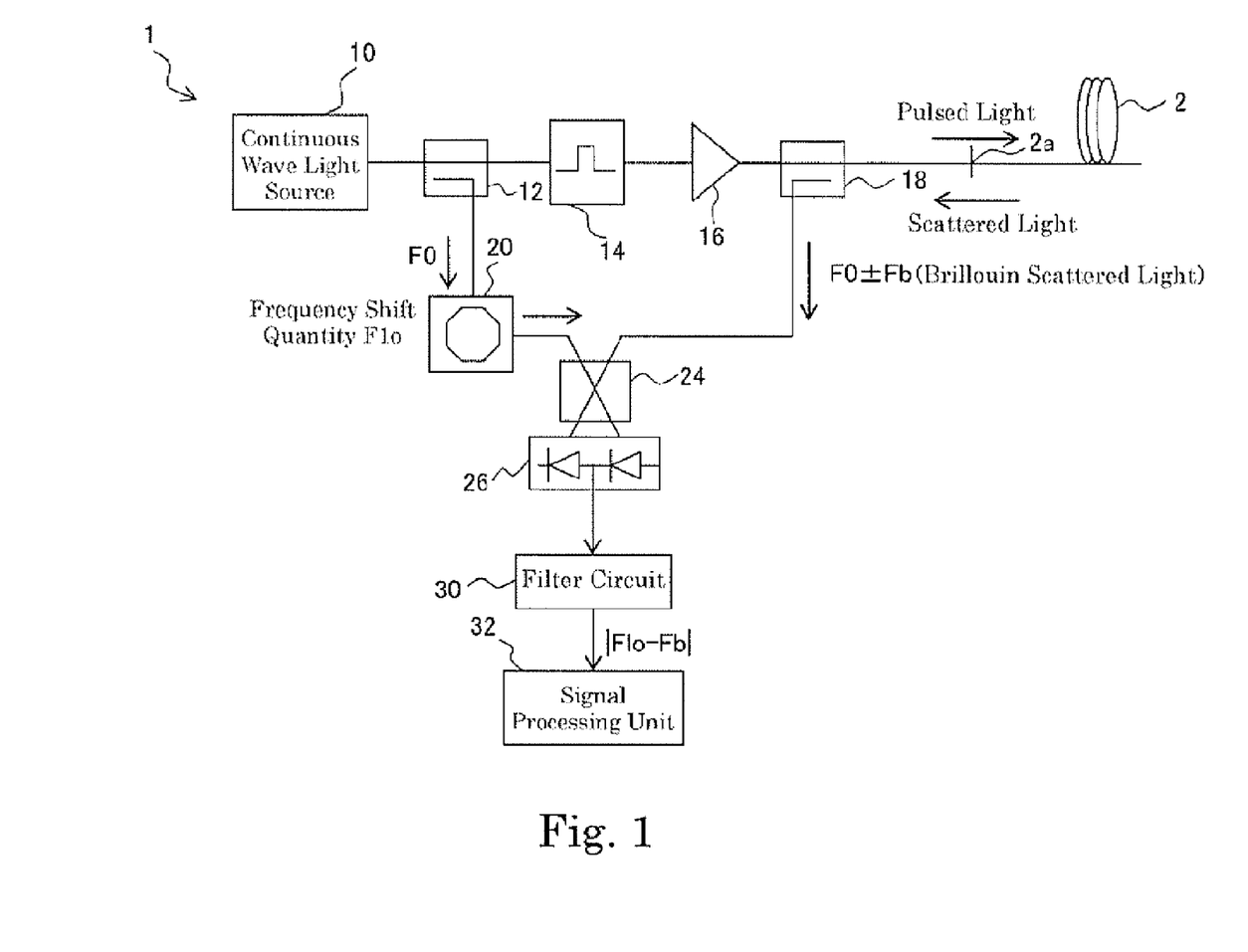
FIG. 1 is a diagram showing a configuration of a distortion measuring device 1 according to an embodiment of the present invention.

FIG. 1 is a diagram showing a configuration of a distortion measuring device 1 according to the embodiment of the present invention. The distortion measuring device 1 is connected to an optical fiber (device under test) 2. Moreover, the distortion measuring device 1 includes a continuous wave light source 10, an optical coupler 12, an optical pulse generator 14, an optical amplifier 16, an optical coupler 18, an optical frequency shifter 20, an optical coupler 24, a heterodyne optical receiver 26, a filter circuit 30, and a signal processing unit 32.

The continuous wave light source 10 generates continuous wave (CW) light. It should be noted that the optical frequency of the continuous wave light is F0. The optical coupler 12 receives the continuous wave light from the continuous wave light source 10, and supplies the optical pulse generator 14 and the optical frequency shifter 20 with the continuous wave light. The optical pulse generator 14 converts the continuous wave light into pulsed light. The optical amplifier 16 amplifies the pulsed light.

The optical coupler 18 receives the pulsed light from the optical amplifier 16, and supplies the optical fiber 2 with the pulsed light via an incident end 2a. Brillouin scattered light (optical frequency F0±Fb) is emitted from the incident end 2a of the optical fiber 2, and is supplied to the optical coupler 18. The optical coupler 18 supplies the optical coupler 24 with the received Brillouin scattered light.

The optical frequency shifter 20 receives the continuous wave light from the optical coupler 12. Then, the optical frequency shifter 20 outputs shifted light The shifted light includes continuous wave light, first side band light, and second side band light. The optical frequencies of the first side band light and the second side band light are respectively shifted from the optical frequency F0 of the continuous wave light by a predetermined frequency shift quantity F1o.

Namely, the first side band light is light having an optical frequency F0+F1o, which is larger than the optical frequency F0 of the continuous wave light by the optical frequency of F1o. The second side band light is light having an optical frequency F0−F1o, which is smaller than the optical frequency F0 of the continuous wave light by the predetermined optical frequency of F1o.

The optical coupler 24 receives the shifted light from the optical frequency shifter 20, receives the Brillouin scattered light from the optical coupler 18, multiplexes them, and supplies the heterodyne optical receiver 26 with the multiplexed light.

The heterodyne optical receiver 26 receives the light multiplexed by the optical coupler 24. Namely, the heterodyne optical receiver 26 receives the Brillouin scattered light from the incident end 2a of the optical fiber 2, which the pulsed light enters, via the optical coupler 24. Further, the heterodyne optical receiver 26 receives the shifted light from the optical frequency shifter 20 via the optical coupler 24 Then, the heterodyne optical receiver 26 outputs an electric signal having a frequency which is difference between the optical frequency of the Brillouin scattered light and the optical frequency of the shifted light.

The frequency of the electrical signal of a component corresponding to the Brillouin scattered light is |F1o−Fb| (=|F0+F1o−(F0+Fb)|)

The filter circuit 30 passes an electric signal output from the heterodyne optical receiver 26 in bands close to |F1o−Fb|, and does not pass a signal in the other bands Thus, the filter circuit 30 extracts the electric signal corresponding to the Brillouin scattered light. These electric signals correspond to spectra.

The signal processing unit 32 receives the output from the filter circuit 30, and derives distortion of the optical fiber (device under test) 2.

Figure 2:
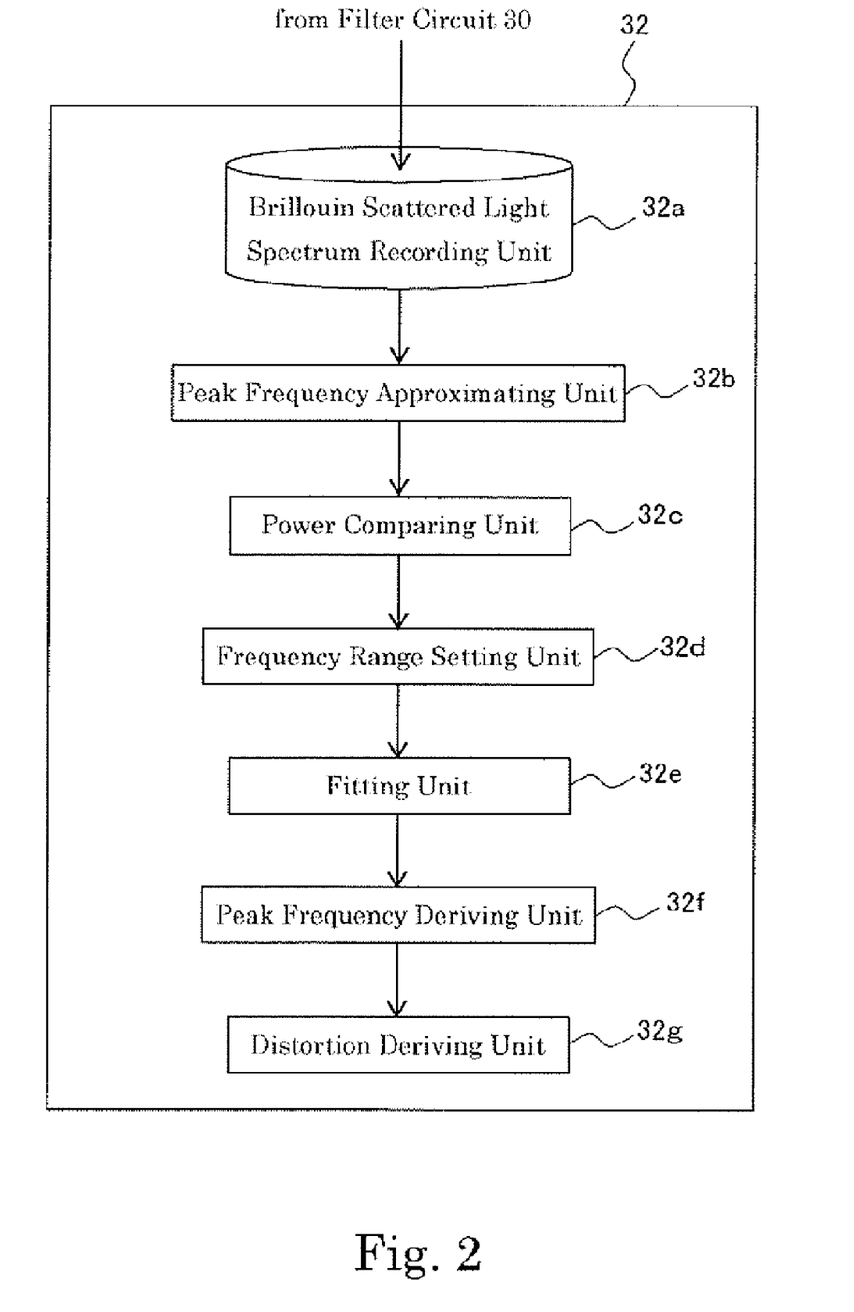
FIG. 2 is a functional block diagram showing a configuration of the signal processing unit 32.

FIG. 2 is a functional block diagram showing a configuration of the signal processing unit 32. The signal processing unit 32 includes a Brillouin scattered light spectrum recording unit 32a, a peak frequency approximating unit 32b, a power comparing unit 32c, a frequency range setting unit 32d, a fitting unit 32e, a peak frequency deriving unit 32f, and a distortion deriving unit 32g.

The Brillouin scattered light spectrum recording unit 32a receives the output from the filter circuit 30. Then, the Brillouin scattered light spectrum recording unit 32a records the electric signal corresponding to the Brillouin scattered light output from the filter circuit 30. This electric signal corresponds to the spectrum of the Brillouin scattered light.

Figure 3:
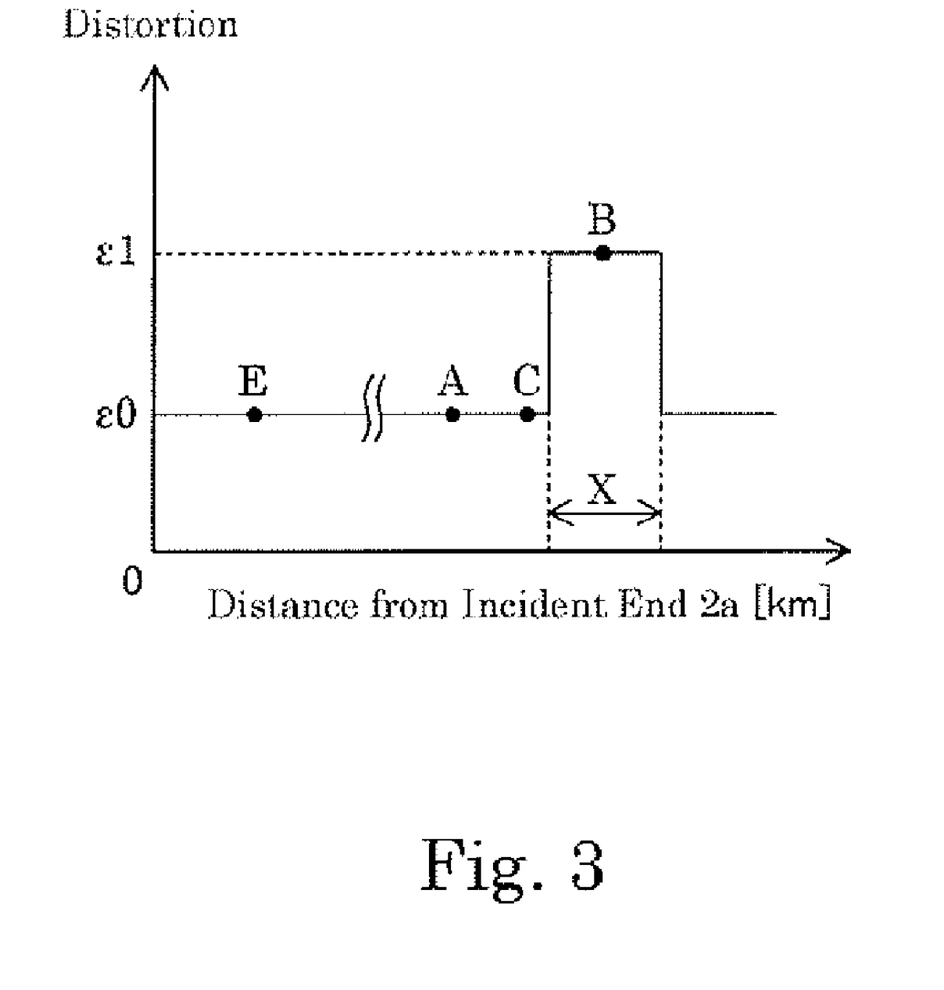
FIG. 3 shows an example of a distortion distribution of an optical fiber 2.

FIG. 3 shows an example of the distortion distribution of the optical fiber 2. The distortion of the optical fiber 2 is generally $\epsilon 0$ along the entire portion. However, the distortion of the optical fiber 2 is $\epsilon 1$ ($>\epsilon 0$) in a distortion section X. Respective points of the optical fiber 2 are referred to as a point E (close to the incident end 2a), a point A (close to and before the distortion section X), a point B (inside the distortion section S and a point C (immediately adjacent to, and before the distortion section X). A description will now be given of measurement of the distortion distribution of the optical fiber 2.

Figure 4:
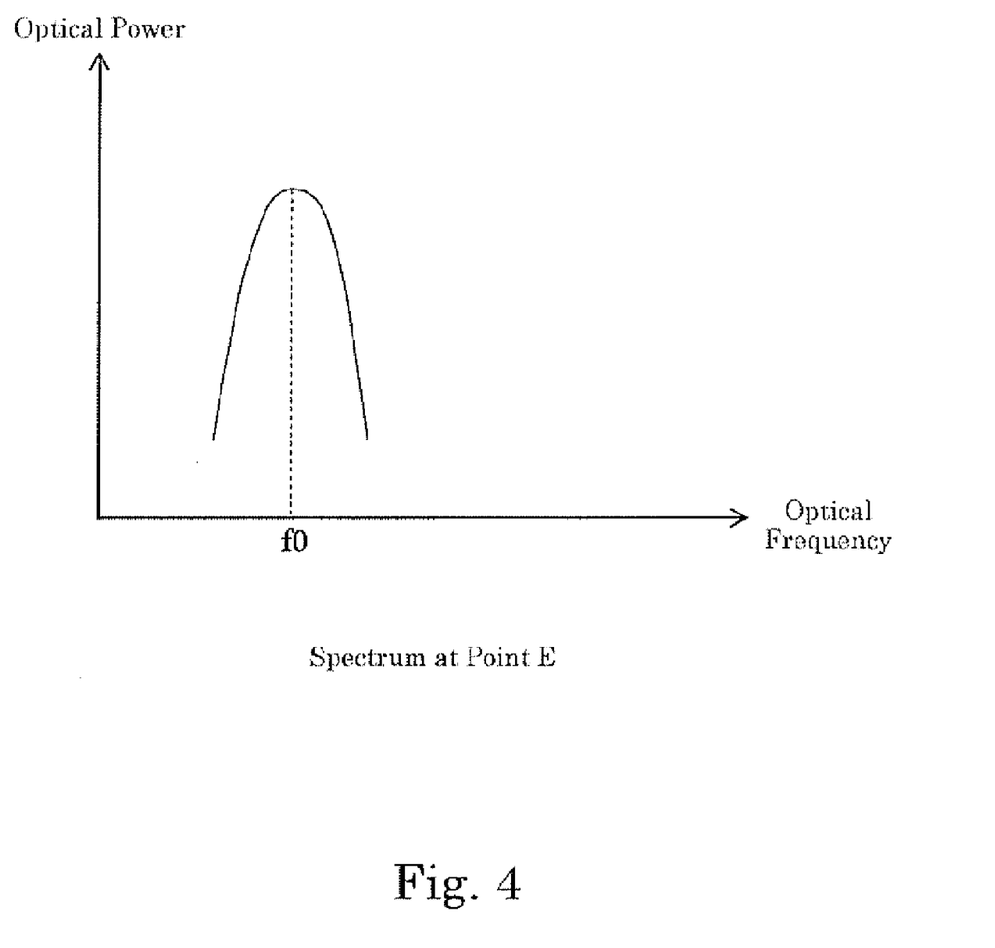
FIG. 4 is a chart showing a power spectrum of the Brillouin scattered light acquired at the point E.

FIG. 4 is a chart showing a power spectrum of the Brillouin scattered light acquired at the point E. The power spectrum acquired at the point E is a spectrum acquired after a period t has passed since the light was made incident to the incident end 2a where the distance from the incident end 2a to the point E is z, and t satisfies a relationship: $z=(ct)/(2n)$. It should be noted that c denotes the velocity of light in vacuum, and n is a refractive index of a portion of the optical fiber 2 where the light passes. In this way, it is possible to determine at which point of the optical fiber 2 a spectrum is acquired according to the period which has passed after the light is made incident to the incident end 2a.

With reference to FIG. 4, the power of the Brillouin scattered light is maximum at the peak frequency f0 corresponding to the distortion $\epsilon 0$.

Figure 5:
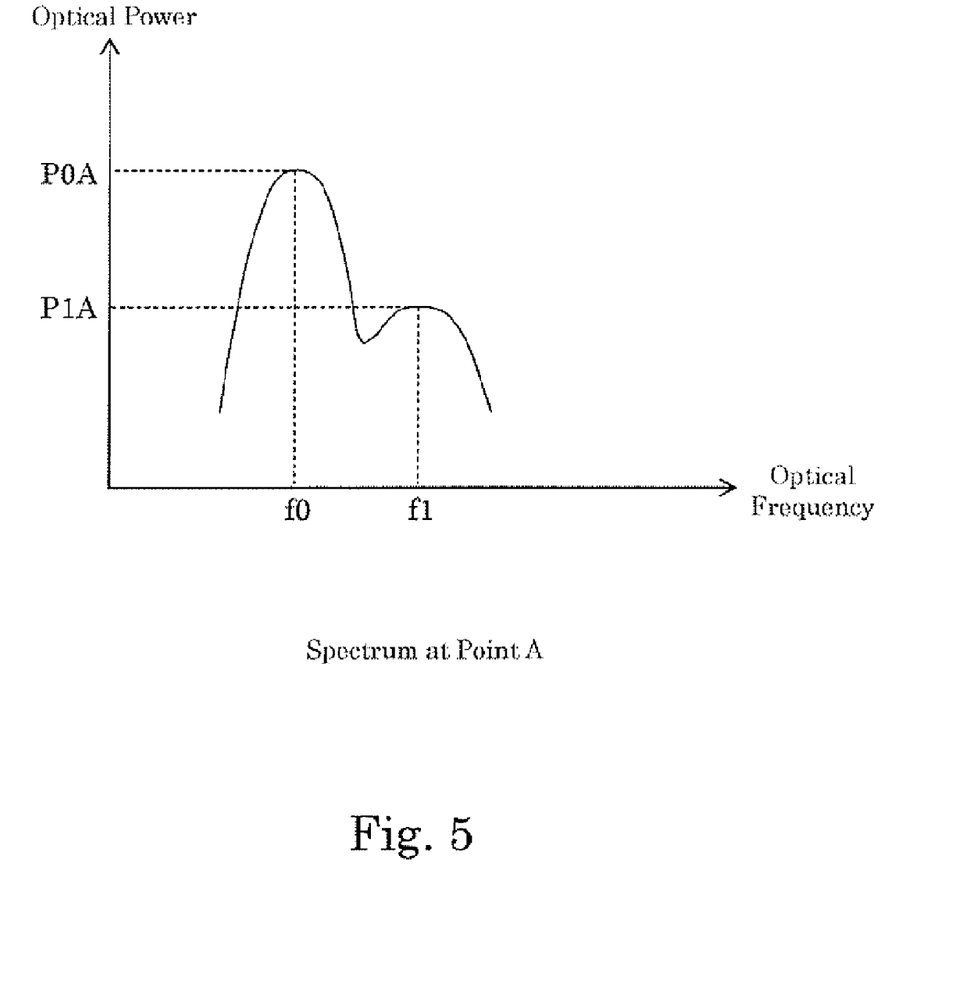
FIG. 5 is a chart showing a power spectrum of the Brillouin scattered light acquired at the point A.

FIG. 5 is a chart showing a power spectrum of the Brillouin scattered light acquired at the point A. Though the distortion at the point A is $\epsilon 0_1$ since the point A is close to the distortion section X (distortion $\epsilon 1$), the power spectrum of the Brillouin scattered light has two maximal points. Namely, the power spectrum takes a maximal value (PA) at the peak frequency f0 corresponding to the distortion $\epsilon 0$, while the power spectrum takes a maximal value (P1A) at the peak frequency f1 corresponding to the distortion $\epsilon 1$. Since the point A is not inside the distortion section X, P0A>P1A.

Figure 6:
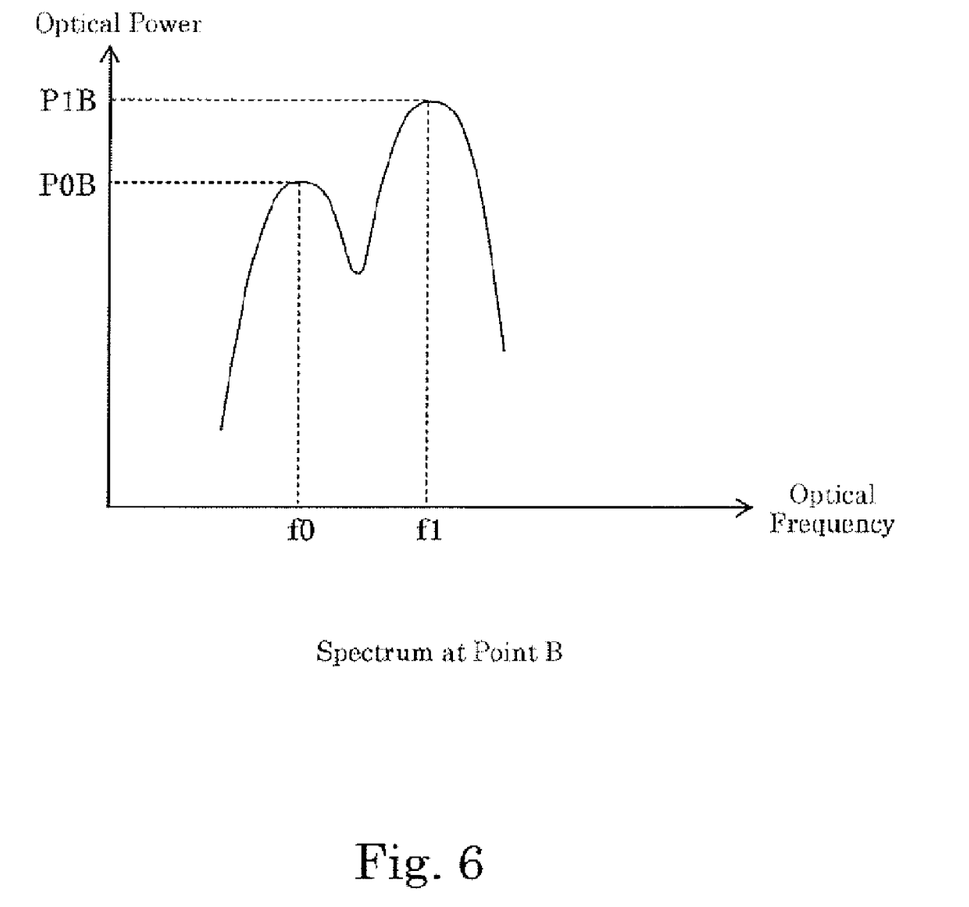
FIG. 6 is a chart showing a power spectrum of the Brillouin scattered light acquired at the point B.

FIG. 6 is a chart showing a power spectrum of the Brillouin scattered light acquired at the point B. Though the point B is inside the distortion section X, the distortion section X is considerably shorter than the length of the optical fiber 2, and the power spectrum of the Brillouin scattered light includes two maximal points. Namely, the power spectrum takes a maximal value (P0B) at the peak frequency f0 corresponding to the distortion $\epsilon 0$, while the power spectrum takes a maximal value (P1B) at the peak frequency f1 corresponding to the distortion $\epsilon 1$. Since the point B is inside the distortion section X, P0B<P1B.

Figure 7:
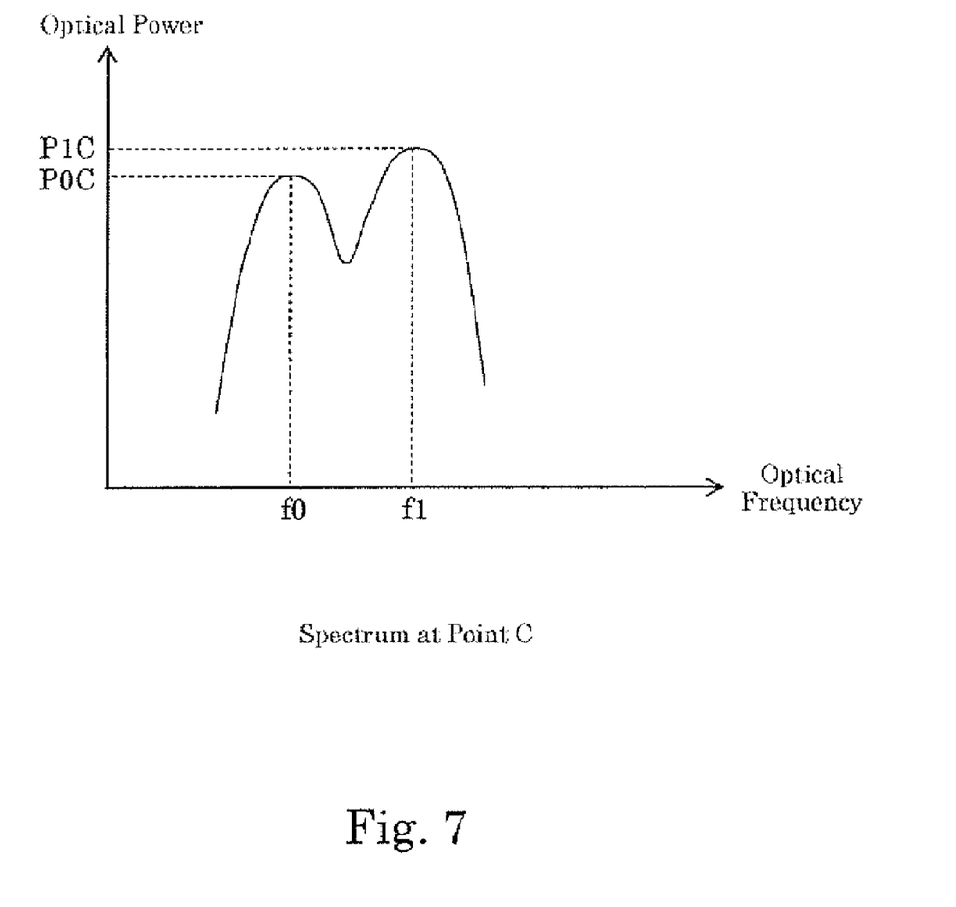
FIG. 7 is a chart showing a power spectrum of the Brillouin scattered light acquired at the point C.

FIG. 7 is a chart showing a power spectrum of the Brillouin scattered light acquired at the point C. The point C is closer to the distortion section X than the point A. Ideally, the power spectrum at the peak frequency f0 is larger than the power spectrum at the peak frequency f1 as shown in FIG. 5. However, since the point C is immediately adjacent to the distortion section X, the power spectrum is influenced by a transient response of the optical fiber 2, and the power spectrum P1C at the peak frequency f1 may thus be slightly larger than the power spectrum P0C at the peak frequency f0. When the power spectrum is represented using a unit dB, P1C−P0C> approximately 2 dB, for example FIG. 8 is a chart showing a correspondence between the distance from the incident end 2a of the optical fiber 2 and the optical power P0 at the peak frequency f0 and the optical power P1 at the peak frequency f1 acquired at this point.

Figure 8:
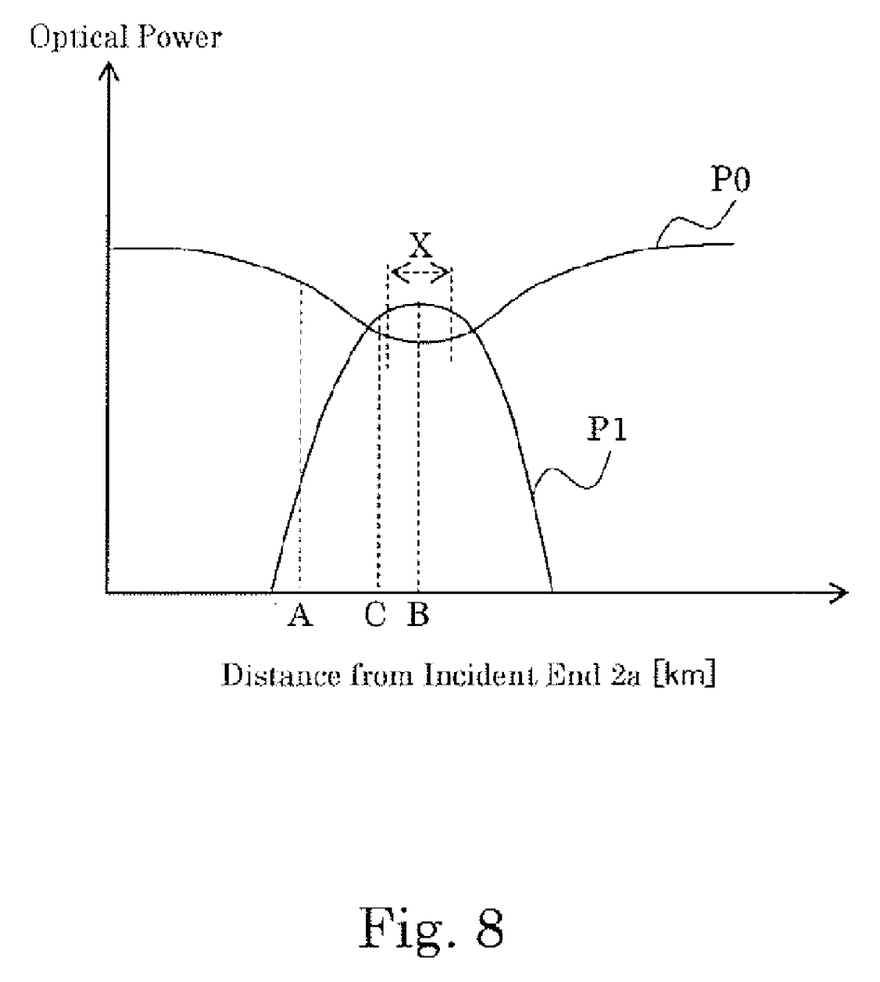
FIG. 8 is a chart showing a correspondence between the distance from the incident end 2a of the optical fiber 2 and the optical power P0 at the peak frequency f0 and the optical power P1 at the peak frequency f1 acquired at this point.

With reference to FIG. 8, the optical power P1 is negligibly small compared with the optical power P0 except for a neighborhood of the distortion section X. Inside the distortion section X, the optical power P1 is larger than the optical power P0. However, the optical power P1 is larger than the optical power P0 due to the influence of the transient response of the optical fiber 2 on the power spectrum immediately adjacent to the distortion section X even outside the distortion section X.

The peak frequency approximating unit 32b acquires an approximated peak frequency at which the spectrum of the Brillouin scattered light takes a maximal value. If the spectrum of the Brillouin scattered light takes a maximal value at one frequency (point E, refer to FIG. 4), there is one approximated peak frequency (f0). If the spectrum of the Brillouin scattered light takes a maximal value at two frequencies (points A, B, and C, refer to FIGS. 5, 6, and 7), there are two approximated peak frequencies (f0, f1).

If there are two approximated peak frequencies, the power comparing unit 32c determines at which approximated peak frequency the power spectrum is larger. Then, the power comparing unit 32c outputs a result of the determination.

For example, for the power spectrum shown in FIG. 5, the power PA at the approximated peak frequency f0 is larger than the power P1A at the approximated peak frequency f1. Thus the power comparing unit 32c outputs the approximated peak frequency f0.

For example, for the power spectrum shown in FIG. 6, the power P1B at the approximated peak frequency f1 is larger than the power P0B at the approximated peak frequency f0. Thus the power comparing unit 32c outputs the approximated peak frequency f1.

If there are two approximated peak frequencies, and the spectrum at a first approximated peak frequency is larger than the spectrum at a second approximated peak frequency by a value equal to or more than a predetermined value (such as 2 dB), the power comparing unit 32c outputs the first approximated peak frequency. Otherwise, the power comparing unit 32c outputs the second approximated peak frequency.

For example, for the power spectrum shown in FIG. 6, the power P1B at the approximated peak frequency f1 is larger than the power P0B at the approximated peak frequency f1 by a value equal to or more than 2 dB. Thus, the power comparing unit 32c outputs the approximated peak frequency f1.

For example, for the power spectrum shown in FIG. 7, though the power P1C at the approximated peak frequency f1 is larger than the power P0C at the approximated peak frequency f0, P1C−P0C<2 dB. Thus, the power comparing unit 32c outputs the approximated peak frequency f0.

The frequency range setting unit 32d sets a predetermined range based on the result (approximated peak frequency f0 or f1) determined by the power comparing unit 32c as a frequency range subject to the fitting. The frequency range is determined by the pulse width of the pulsed light. For example, if the pulse width is 10 ns, the width of the frequency range is set to 100 MHz, which is ±501 MHz of the result determined by the power comparing unit 32c. If the pulse width is 20 ns, the width of the frequency range is set to 80 MHz, which is ±40 MHz of the result determined by the power comparing unit 32c.

The fitting unit 32e approximates the power spectrum in the frequency range set by the frequency range setting unit 32d by a predetermined function (such as a Lorentzian function).

Figure 9:
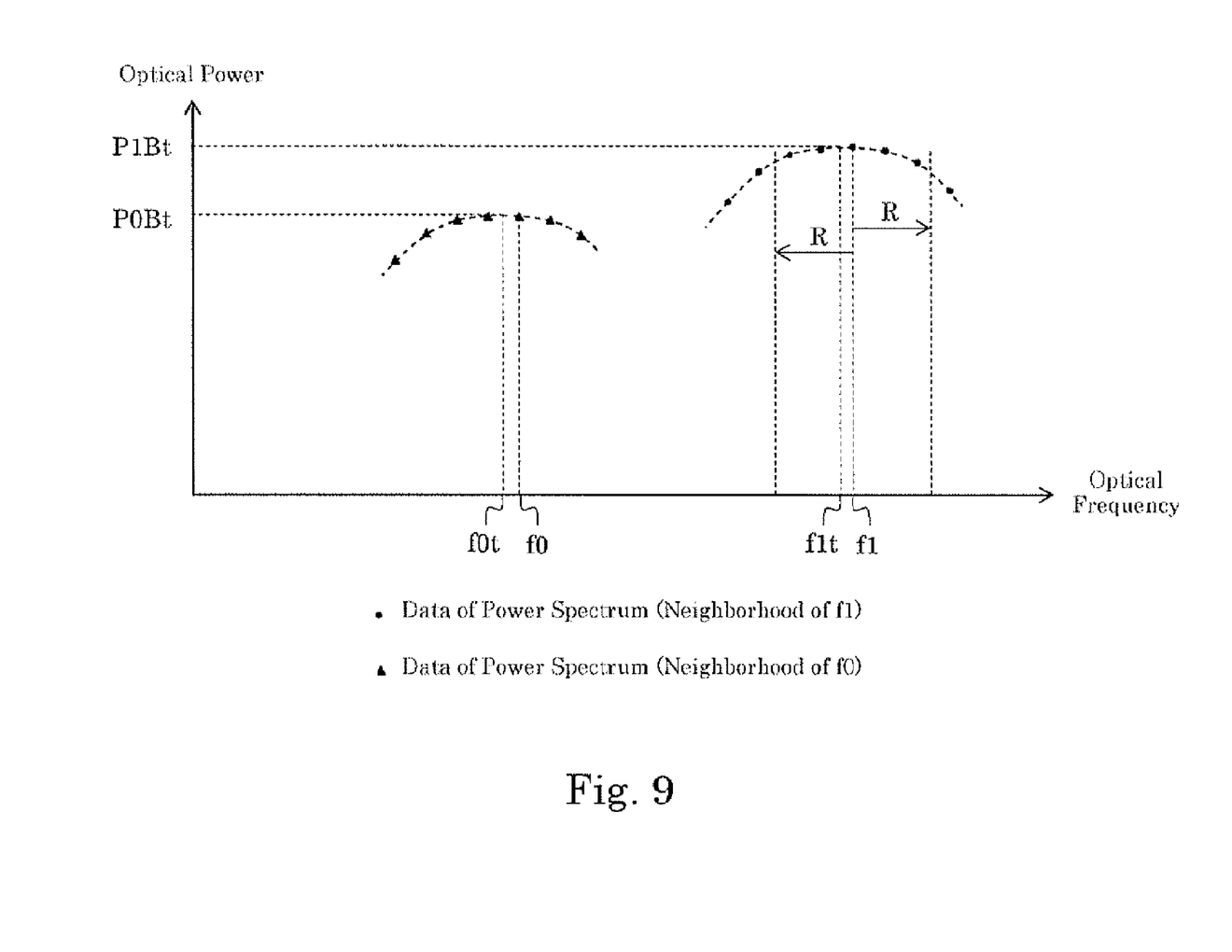
FIG. 9 is a chart describing a frequency range set by a frequency range setting unit 32d.

FIG. 9 is a chart describing the frequency range set by the frequency range setting unit 32d. FIG. 9 is an enlarged view of neighborhoods of the approximated peak frequencies f0 and f1 in FIG. 6. The power spectrum is illustrated continuously as a solid line in FIGS. 4 to 8. However, as shown in FIG. 9, the power spectrum is recorded in the Brillouin scattered light spectrum recording unit 32a as discrete data, and the approximated peak frequencies f0 and f1 are simply discrete data. As a result, the approximated peak frequencies f0 and f1 are different from true peak frequencies f0t and f1t more or less. In the case shown in FIG. 9, the frequency range setting unit 32d sets a range ±R [MHz] (R is 50 or 40, for example) of the approximated peak frequency f1 to the frequency range. In FIG. 9, P0Bt and P1Bt respectively denote an optical power corresponding to the approximated peak frequency f0 and an optical power corresponding to the approximated peak frequency f1.

Figure 10:
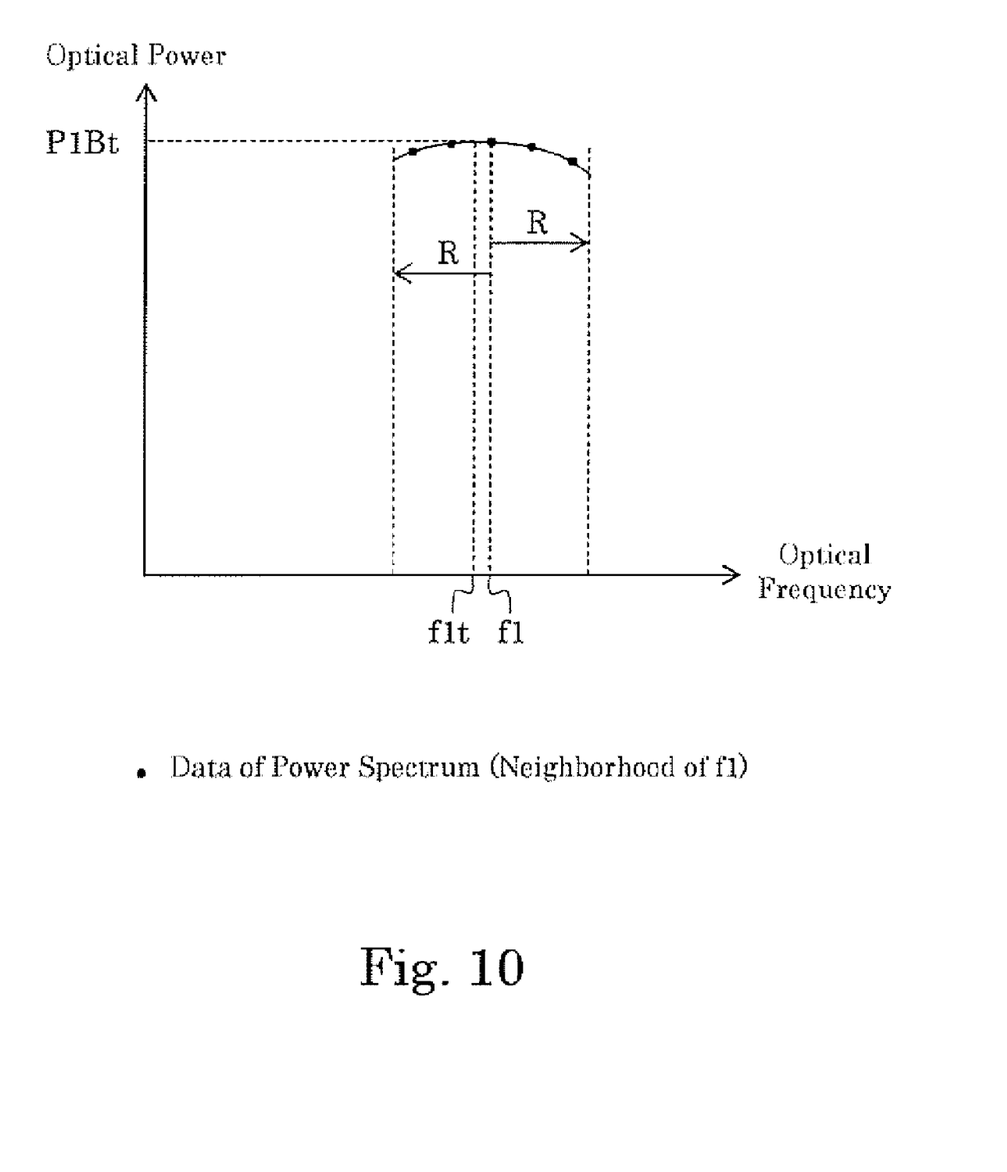
FIG. 10 is a chart describing an operation of a fitting unit 32e.

FIG. 10 is a chart describing an operation of the fitting unit 32e.

FIG. 10 illustrates an extracted portion corresponding to the frequency range in FIG. 9. The fitting unit 32e approximates the frequency range by a Lorentzian function. The approximated result is represented by a solid line.

The peak frequency deriving unit 32f derives the true peak frequency f1t where the function (such as a Lorentzian function) derived by the fitting unit 32e takes the maximum value (refer to FIG. 10).

Figure 11:
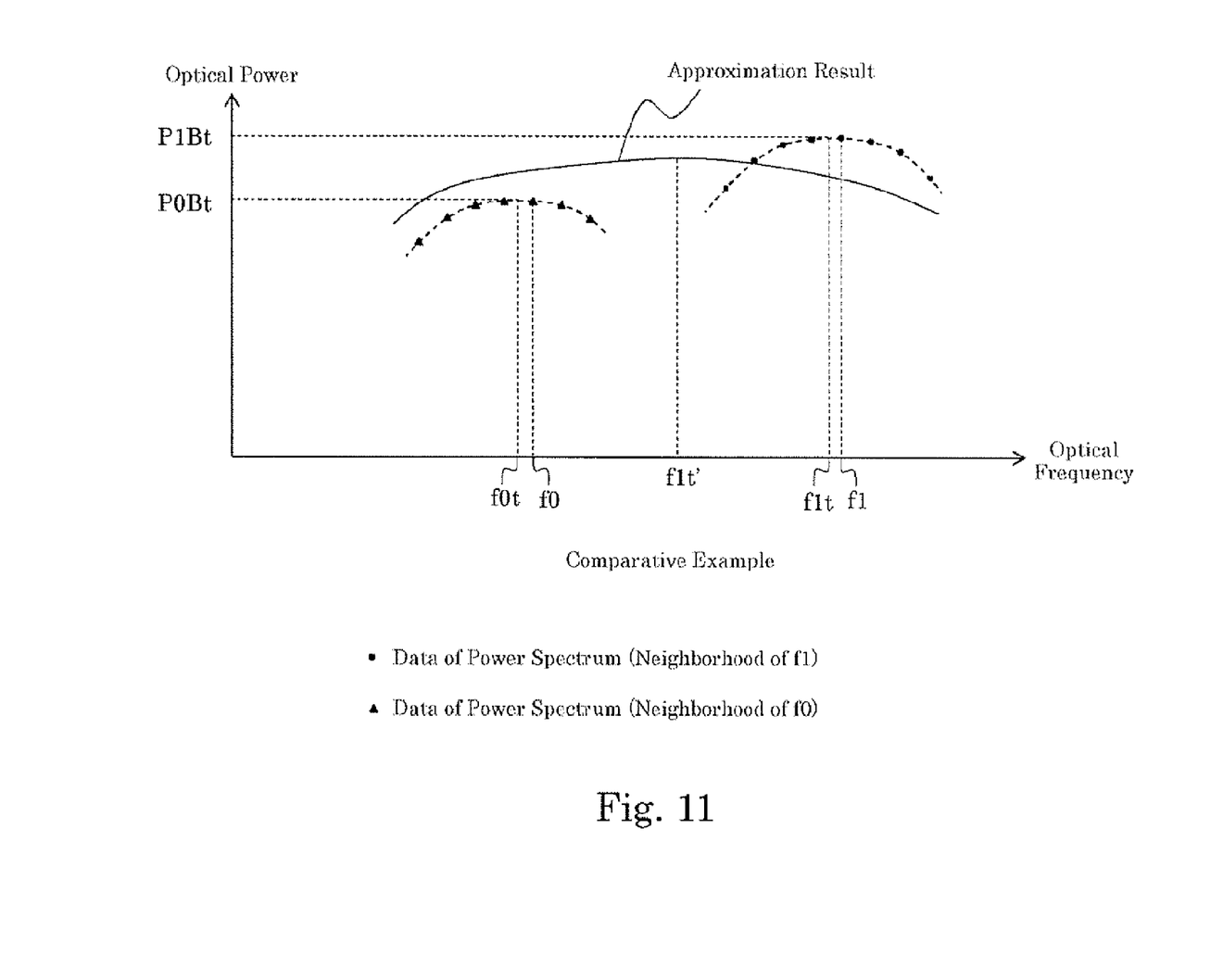
FIG. 11 is a chart showing a fitting result and a true peak frequency f1t' acquired as a result if a fitting is carried out using a power spectrum within a half-power bandwidth from an approximated peak frequency f1.

FIG. 11 is a chart showing a fitting result and a true peak frequency f1t' acquired as a result if the fitting is carried out using a power spectrum within a half-power bandwidth from the approximated peak frequency f1.

In the comparative example shown in FIG. 11, the approximation is carried out using data within the range of 3 dB from the P1B by means of a Lorentzian function. Since data close to the approximated peak frequency f0 aye also used for the fitting, an error is larger than that of the case shown in FIG. 10. As a result, the acquired true peak frequency f1t' is largely different from the true peak frequency f1t.

In this way, the present embodiment shown in FIG. 10 can acquire a true peak frequency more precisely than the comparative example shown in FIG. 11.

The distortion deriving unit 32g derives the distortion of the optical fiber 2 based on the true peak frequency derived by the peak frequency deriving unit 32f. A difference between the true peak frequency and the frequency F0 is a Brillouin frequency shift $s_B$.

Between the distortion ε of the optical fiber 2 and the Brillouin frequency shift $S_B$, there is a relationship: $s_B(\epsilon)=s_B(0)+(ds_B/d\epsilon)\ \epsilon$. It should be noted that $S_B(0)$ is a Brillouin frequency shift when the distortion ε n is 0. Thus, if the Brillouin frequency shift $s_B$ is known, it is possible to derive the distortion r of the optical fiber 2.

A description will now be given of an operation of the embodiment of the present invention First, the continuous wave light source 10 generates the continuous wave light.

The continuous wave light is supplied to the optical pulse generator 14 via the optical coupler 12. The optical pulse generator 14 converts the continuous wave light into the pulsed light. The pulsed light is amplified by the optical amplifier 16 passes the optical coupler 18, and is made incident to the incident end 2a of the optical fiber 2.

The Brillouin scattered light is emitted from the incident end 2a of the optical fiber 2, and is supplied to the optical coupler 18. The optical coupler 18 supplies the optical coupler 24 with the received Brillouin scattered light.

Moreover, the continuous wave light is supplied to the optical frequency shifter 20 via the optical coupler 12.

The optical frequency shifter 20 receives the continuous wave light (optical frequency F0), and outputs the shifted light (continuous wave light (optical frequency F0)), the first side band light (optical frequency F0+F1o), and the second side band light (optical frequency F0−F1o). The shifted light output from the optical frequency shifter 20 is supplied to the optical coupler 24.

The optical coupler 24 receives the shifted light from the optical frequency shifter 20, receives the Brillouin scattered light from the optical coupler 18, multiplexes them, and supplies the heterodyne optical receiver 26 with the multiplexed light.

Then, the heterodyne optical receiver 26 receives the light multiplexed by the optical coupler 24, and outputs the electric signal having the frequency which is difference between the optical frequency of the Brillouin scattered light and the optical frequency of the shifted light.

On this occasion, the filter circuit 30 passes the electric signal output firm the heterodyne optical receiver 26 in the bands close to the frequency |F1o−Fb| (=|F0+F1o−(F0+Fb)|), and does not pass signals in the other bands. Thus, the filter circuit 30 serves as extracting means which extracts the electric signal corresponding to the Brillouin scattered light. The electric signal corresponding to the Brillouin scattered light is recorded in the Brillouin scattered light spectrum recording unit 32a of the signal processing unit 32.

The peak frequency approximating unit 32b reads the recorded contents of the Brillouin scattered Light spectrum recording unit 32a, and acquires the approximated peak frequencies (f0, f1).

The power comparing unit 32c receives the approximated peak frequencies (f0, f1), and determines at which approximated peak frequency the power spectrum is larger. Then, the power comparing unit 32c outputs a result of the determination. If the power at the approximated peak frequency f1 is larger than the power at the approximated peak frequency f0, and the difference between the powers is less than the predetermined value (such as 2 dB) (refer to FIG. 7), the power comparing unit 32c outputs the approximated peak frequency f0.

The frequency range setting unit 32d sets the predetermined range based on the result (approximated peak frequency f0 or f1) determined by the power comparing unit 32c as the frequency range subject to the fitting (refer to FIG. 9).

The fitting unit 32e approximates the power spectrum in the frequency range set by the frequency range setting unit 32d by the predetermined function (such as a Lorentzian function) (refer to FIG. 10).

The peak frequency deriving unit 32f derives the true peak frequency f1t where the function (such as a Lorentzian function) derived by the fitting unit 32e takes the maximum value (refer to FIG. 10).

The distortion deriving unit 32g derives the distortion of the optical fiber 2 based on the peak frequency derived by the peak frequency deriving unit 32f.

According to the embodiment of the present invention, since (1) the power comparing unit 32c determines at which of the approximated peak frequencies (f0, f1) the power spectrum is large); (2) the frequency range setting unit 32d sets the predetermined range based on the determination result as the frequency range subject to the fitting (refer to FIG. 9), (3) the fitting unit 32e fits the predetermined function to the power spectrum in the predetermined range (refer to FIG. 10), and (4) the true peak frequency f1t is derived based on the result of the fitting (refer to FIG. 10), the true peak frequency can be precisely measured compared with the case where the predetermined function is fitted to data within the half-power bandwidth from the approximated peak frequency f1, and the true peak frequency f1t' is derived from the fitting result (refer to FIG. 11). Since the distortion deriving unit 32g derives the distortion of the optical fiber 2 from the precise true peak frequency, the distortion of the optical fiber 2 can be precisely measured.

It should be noted that the above-described embodiment may be realized in the following manner. A computer is provided with a CPU, a hard disk, and a media (such as a floppy disk (registered trade mark) and a CD-ROM) reader, and the media reader is caused to read a medium recording a program realizing the above-described respective components (such as the signal processing unit 32), thereby installing the program on the hard disk. This method may also realize the above-described embodiment.

What is claimed is:

1. A distortion measuring device comprising:
    a peak frequency approximator that acquires an approximated peak frequency, of two types of approximated peak frequencies, at which a spectrum of Brillouin scattered light generated by supplying a device under test with incident light has a maximum value;
    a peak frequency deriver that derives a peak frequency at which the spectrum has a maximum value within a range of a frequency, the range of the frequency comprising a predetermined range from the approximated peak frequency at which the spectrum has a larger value; and
    a distortion deriver that derives distortion of the device under test based on the derived peak frequency.

2. The distortion measuring device according to claim 1, wherein the peak frequency deriver approximates the spectrum in the range of the frequency by a predetermined function, and derives a frequency at which the predetermined function has a maximum value as the peak frequency.

3. The distortion measuring device according to claim 1, wherein the incident light is pulsed light, and the predetermined range is defined by a pulse width of the pulsed light.

4. A distortion measuring method comprising:
    acquiring an approximated peak frequency, of two types of approximated peak frequencies, at which a spectrum of Brillouin scattered light generated by supplying a device under test with incident light has a maximum value;
    deriving a peak frequency at which the spectrum has a maximum value within a range of a frequency, the range of the frequency comprising a predetermined range from the approximated peak frequency at which the spectrum has a larger value; and
    deriving distortion of the device under test based on the derived peak frequency.

5. The distortion measuring method according to claim 4, wherein the incident light is pulsed light, and the predetermined range is defined by a pulse width of the pulsed light.

6. The distortion measuring method according to claim 4, wherein the deriving comprises approximating the spectrum in the range of the frequency by a predetermined function and determines a frequency at which the predetermined function has a maximum value as the peak frequency.

7. A computer-readable medium having a program of instructions for execution by the computer to perform processing for measuring a distortion, the processing comprising:
    acquiring an approximated peak frequency, of two types of approximated peak frequencies, at which a spectrum of Brillouin scattered light generated by supplying a device under test with incident light has a maximum value;
    deriving a peak frequency at which the spectrum has a maximum value within a range of a frequency, the range of the frequency comprising a predetermined range from the approximated peak frequency at which the spectrum has a larger value; and
    deriving distortion of the device under test based on the derived peak frequency.

8. The computer readable medium according to claim 7, wherein the incident light is pulsed light, and the predetermined range is defined by a pulse width of the pulsed light.

9. A distortion measuring device comprising:
    a peak frequency approximator that acquires an approximated peak frequency, of two types of approximated peak frequencies, at which a spectrum of Brillouin scattered light generated by supplying a device under test with incident light has a maximum value;
    a peak frequency deriver that derives a peak frequency at which the spectrum has a maximum value within a range of a frequency, and when the spectrum at a first approximated peak frequency is larger than at a second approximated peak frequency by a value equal to or greater than a predetermined value, the range of the frequency comprises a predetermined range from the first approximated peak frequency; and
    a distortion deriver that derives distortion of the device under test based on the derived peak frequency.

10. The distortion measuring device according to claim 9, wherein the peak frequency deriver approximates the spectrum in the range of the frequency by a predetermined function, and derives a frequency at which the predetermined function has a maximum value as the peak frequency.

11. The distortion measuring device according to claim 9, wherein the incident light is pulsed light, and the predetermined range is defined by a pulse width of the pulsed light.

12. A distortion measuring method comprising:
    acquiring an approximated peak frequency, of two types of approximated peak frequencies, at which a spectrum of Brillouin scattered light generated by supplying a device under test with incident light has a maximum value;
    deriving a peak frequency at which the spectrum has a maximum value within a range of a frequency, and when the spectrum at a first approximated peak frequency is larger than at a second approximated peak frequency by a value equal to or greater than a predetermined value, the range of the frequency comprises a predetermined range from the first approximated peak frequency; and
    deriving distortion of the device under test based on the derived peak frequency.

13. The distortion measuring method according to claim 12, wherein the incident light is pulsed light, and the predetermined range is defined by a pulse width of the pulsed light.

14. The distortion measuring method according to claim 12, wherein the deriving comprises approximating the spectrum in the range of the frequency by a predetermined function and determines a frequency at which the predetermined function has a maximum value as the peak frequency.

* * * * *